RE 24,893
Dec. 30, 1958    H. J. LOFTIS    2,866,613
RESILIENT MOUNTING
Filed Feb. 24, 1956
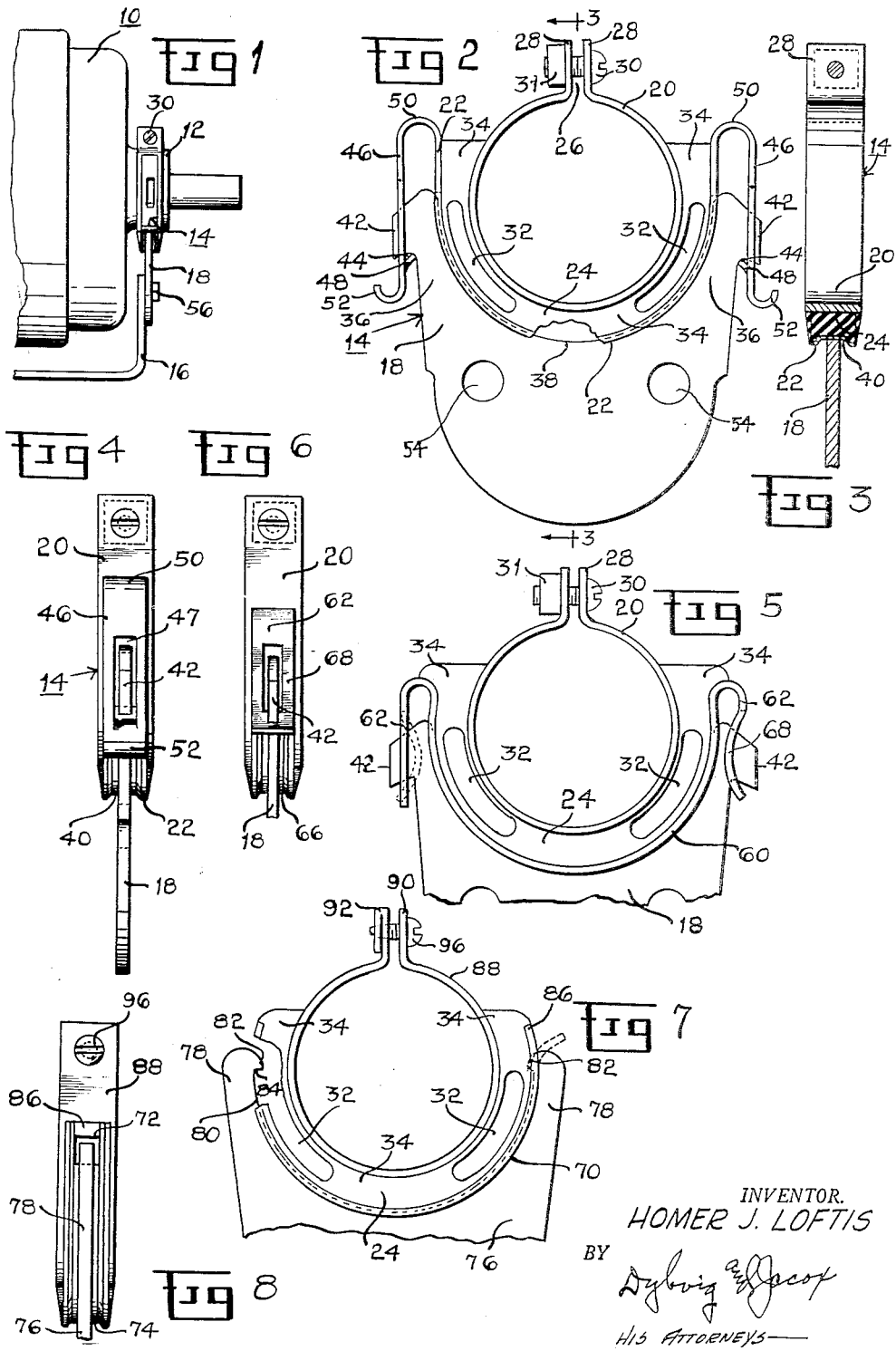
INVENTOR.
HOMER J. LOFTIS
BY
Dybvig and Jacox
HIS ATTORNEYS

United States Patent Office 2,866,613
Patented Dec. 30, 1958

2,866,613

RESILIENT MOUNTING

Homer J. Loftis, Ironton, Ohio, assignor to Henrite Products Corporation, a corporation of Ohio Application February 24, 1956, Serial No. 567,522

5 Claims. (Cl. 248—26)

This invention relates to a resilient mounting and more particularly to improvements in vibration damping mountings for electric motors and the like, although not necessarily so limited.

The present invention is an improvement in resilient ring-type mountings such as that patented by H. D. Geyer, United States Letters Patent No. 2,044,385. The improvements reside chiefly in the means for securing the ring-type mounting to a suitable cradle member.

An object of this invention is to provide a resilient mounting including a suitably constructed cradle member which can be assembled without screws or rivets or the like, thus providing for economical and rapid assembly and installation.

Another object of this invention is to provide a resilient mounting having improved torsional yield characteristics, wherein a conventional resilient mounting ring is modified for yielding attachment to a cradle member.

Still another object of this invention is to provide a resilient mounting having an inner adjustable split-ring clamp for attachment to the supported object, the split-ring clamp allowing rotational adjustment of the supported object relative to the support whenever this is desired.

Other objects and advantages reside in the construction of parts, the combination thereof and the mode of operation, as will become more apparent from the following description.

In the drawing

Figure 1 is a side elevation showing one end of an electric motor mounted by means of the resilient mounting of this invention.

Figure 2 is an enlarged front elevation of the resilient mounting.

Figure 3 is a sectional view, taken substantially along the line 3—3 of Figure 2.

Figure 4 is a side elevation, enlarged to the scale of Figure 2, of the resilient mounting.

Figure 5 is a front elevation, with parts broken away, of a first modification of the resilient mounting.

Figure 6 is a side elevation of the modification of Figure 5.

Figure 7 is a front elevation, with parts broken away, of a second modification.

Fgure 8 is a side elevation of the modification of Figure 7.

Referring to the drawing in detail, Figure 1 shows a portion of an electric motor 10, or other object to be supported for vibratory movement, which is provided with a trunnion or hub 12 for engagement with a resilient mounting. The resilient mounting of this invention, which is indicated by the reference numeral 14, is attached to a support member such as that shown at 16 as a means of supporting the motor 10, or the like, for vibratory motion relative to the support member 16.

The resilient mounting 14 as shown in Figures 2, 3, and 4 comprises a modified form of the conventional resilient mounting ring for motors nestled into a cradle member 18. The modified mounting ring includes an inner split-ring clamp 20 for engagement with the hub 12 of the motor, an outer ring segment 22 adapted for attachment to the cradle member 18, and a resilient ring segment 24 disposed between the split-ring clamp 20 and the outer ring segment 22.

The inner split-ring clamp 20 is shown as a stamped metal ring split at 26 and provided with opposed outwardly radially extending lugs 28 projecting from the ends thereof. Each lug 28 has a hole therein into which a threaded screw 30 may be inserted to engage a nut 31 for the purpose of tightening the clamp upon the hub 12 of the motor. The split-ring clamp 20 is thus of variable diameter and need not be manufactured to close tolerances.

The resilient ring segment 24 distributed between the inner split-ring clamp 20 and the outer ring segment 22 is secured to both members by vulcanizing or other suitable means. The resilient ring segment 24, which may be an elastomer such as rubber, functions to absorb and damp vibratory motions of the split-ring clamp 20 attached to the motor 10. Two arcuate slots or openings 32 in the resilient ring segment divide the segment, so as to provide three radially distributed solid spokes 34 which operate to damp torsional as well as radial vibrations. In order to satisfactorily damp upward thrusts of the motor 10 relative to the support member 16, the resilient segment 24 must extend more than 180° around the inner split-ring clamp 20 to provide spokes 34 distributed over more than 180° of the inner split-ring clamp 20. Ample clearance is provided, however, adjacent the lugs 28 of the split-ring clamp, so that the screw 30 may be adjusted to properly tighten the clamp.

The outer ring segment 22 also extends concentric with the inner split-ring clamp for more than 180°, so as to provide support for each of the spokes 34.

The present invention relates primarily to the means whereby the outer ring segment 22 of the modified resilient mounting ring is secured to the cradle member 18. In the preferred embodiment of Figures 2, 3, and 4, the cradle member 18 is a U-shaped metal plate having a pair of furcations 36, each having an arcuate inner margin defining a portion of a substantially semi-circular yoke 38. The outer ring segment 22 of the modified resilient mounting ring has a circumferentially extending groove 40 therein, for engaging the yoke 38 so that the resilient mounting ring may be nestled into the cradle member 18.

Each furcation 36 is provided with an outwardly directed tongue portion 42 forming an acute angle therewith so as to form a notch 44 in the outer margin thereof. Each end of the outer ring segment 22 is bent at 50 so as to wrap around the adjacent furcation 36 to form an inversely directed flange 46 adjacent the furcation 36. Each flange 46 has an elongate aperture 47 therein, into which the adjacent tongue portion 42 projects. A finger 48 is stuck out from each flange 46 into the adjacent notch 44 to secure the outer ring segment 22 rigidly to the cradle member 18. The fingers 48 are forcefully wedged into the notches 44, so that the flanges 46 are strained outwardly. The internal stresses thereby created set up a restoring torque centered in the folded portion 50 of the outer ring segment 22, urging the fingers 48 in the notches 44. The extreme ends 52 of the flanges 46 are curved outwardly to reduce any tendency the flange 46 may have to buckle under tensile stresses created by severe upward thrusts of the supported object.

The cradle member 18 has a pair of holes 54 therein, into which may be inserted a bolt 56 for securing the cradle member 18 to the support member 16, as shown in Figure 1.

In the first modification of Figures 5 and 6, the shape of the outer ring segment 22 of the preferred embodiment is changed to provide an alternative means for securing the outer ring segment to the cradle member 18. The first modification is provided with an outer ring segment 60, which is proportionately smaller in overall length than the segment 22 of the preferred embodiment, providing for smaller inversely directed terminal flanges 62 wrapped around the furcations of the cradle member thus conrresponding to the flanges 46 of the preferred embodiment. The flanges 62 each have an elongate aperture 64 therein for accommodating the adjacent tongue portion of the cradle member 18. The outer ring segment 60 has a circumferential groove 66 therein, adapted to receive the yoke of the cradle member 18.

The flanges 62 are each kinked at 68 to shorten the flanges so as to draw the ends thereof into the notches 44 of the cradle member 18. By making the flanges 62 as short as possible, the arcuate kinked portion 68 operates as a spring under permanent stress tending to draw or wedge the wall portion of the flange bounding the aperture therein into the notch 44.

In both embodiments of the resilient mounting shown in Figures 2 and 5, the metal stamping forming the outer ring segment of the resilient mounting yields to torsional stresses transmitted by the resilient ring segment 24, permitting damped rotary movement of the mounting ring within the cradle member 18, thus augmenting the torsional yield of the resilient ring segment.

In the second modification of Figures 7 and 8, the cradle member and the outer ring segment are further modified to provide another alternative means for securing the ring mounting to the cradle member.

The modification of Figures 7 and 8 includes an outer ring segment 70 extending substantially more than 180° around a modified inner split-ring clamp 88 said ring segment 70 having therein a square aperture 72 adjacent each end thereof, each said aperture exposing a portion of the adjacent resilient ring segment 24. As is in the preferred embodiment, the outer ring segment is provided with a circumferentially extending groove 74 adapted to receive the yoke of the cradle member.

The second modification includes a modified U-shaped cradle member 76 having a pair of furcations 78 cooperating to provide a yoke 80 for engagement with the outer ring segment 70. Each furcation 78 has an inwardly directed tongue portion 82 adjacent the end thereof projecting into the corresponding aperture 72 in the outer ring segment 70 to become embedded in the resilient ring segment 24. The tongue portions 82 provide notches 84 in the yoke 80 which engage the marginal portions of the outer ring segment 70 adjacent the apertures 72 therein. These apertures 72 extend to the ends of the furcations 78. The marginal portions are drawn tightly into the corresponding notches 84 by bending the extreme ends 86 of the outer ring segment 70 outwardly around the ends of the furcations 78 of the cradle member 76 such that the furcations 78 project partially into the apertures 72. The ends 86 are under permanent stress, coacting with the furcations to draw the wall portions bounding the apertures 72 in the outer ring segment 70 tightly into the notches 84.

The modification of Figures 7 and 8 shows a modified inner split-ring clamp 88 having radially outwardly extending lugs 90 and 92, the lug 92 being folded to double thickness for accommodating a self-tapping screw 96, to be substituted for the threaded screw 30 and nut 31 of the other embodiments of this invention.

The use of the split-ring clamp in the present invention presents the advantage that the supported object may be rotated to any desired orientation merely by loosening the split-ring clamp.

The enhanced torsional yield characteristics of these mountings make them highly suitable for use in supporting motors having high starting torques. Since the ring mounting is yieldingly secured to the cradle member, the high starting torques of the motor are partially absorbed by the resilient mounting, diminishing the shock to the rotor shaft and associated equipment.

Although the preferred embodiment and various modifications of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A resilient mounting attachable to a support member comprising an inner metal split-ring having clamping means thereon whereby the inner ring may be clamped tightly upon an interior supported member, a metallic outer ring segment surrounding more than half of said inner ring but leaving a substantial clearance adjacent said clamping means, a resilient elastomeric ring segment interposed between and secured to both said inner metal ring and said outer metal ring segment, and a cradle member provided with means for attachment to said support member, said cradle member having a pair of furcations projecting therefrom, said furcations having arcuate inner margins defining a substantially semi-circular yoke into which said outer ring segment is seated, said furcations terminating in spaced relation to the ends of said outer ring segment, said outer ring segment having an inverse curvature adjacent the ends thereof whereby said ends arch over the ends of said furcations, said furcations each having a tongue portion projecting therefrom and cooperating therewith to form an acute angled notch in the margin thereof adjacent said tongue portion, said outer ring segment having complementary apertures therein receiving said tongue portions, there being a misalignment between said tongue portions and said apertures such that said tongue portions in projecting through said apertures cooperate to stress said outer ring segment, the stress in said outer ring segment biasing marginal portions thereof adjacent the apertures therein into the notches of said cradle member to thereby fasten said outer ring segment to said cradle member.

2. A resilient mounting attachable to a support member comprising an inner metal split-ring having clamping means thereon whereby the inner ring may be clamped tightly upon an interior supported member, a metallic outer ring segment surrounding more than half of said inner ring but leaving a substantial clearance adjacent said clamping means, a resilient elastomeric ring segment interposed between and secured to both said inner metal ring and said outer metal ring segment, and a cradle member providde with means for attachment to said support member, said cradle member having a pair of furcations projecting therefrom, said furcations have arcuate inner margins defining a substantially semi-circular yoke, said outer ring segment having a circumferentially extending groove therein into which said yoke is seated, the furcations forming said yoke terminating in spaced relation to the ends of said outer ring segment, said outer ring segment having an inverse curvature adjacent the ends thereof whereby said ends arch over the ends of said furcations, said furcations each having a tongue portion projecting therefrom and cooperating therewith to form a notch in the margin thereof adjacent said tongue portion, said outer ring segment having complementary apertures therein receiving said tongue portions, there being a misalignment between said outer ring segment and said cradle member such that said tongue portions in projecting through said apertures cooperate to stress said outer ring segment, there being portions of said outer ring segment adjacent the apertures therein seated in the notches of said cradle member, the stress in said outer ring segment biasing said portions into the notches of said cradle member to fasten said outer ring segment to said cradle member.

3. A resilient mounting according to claim 2 wherein the portions of said outer ring segment seated in the notches of said cradle member comprise fingers struck from said outer ring segment adjacent the apertures therein.

4. The resilient mounting according to claim 2 wherein the tongue portions of said cradle member project outwardly of said yoke, the apertures of said outer ring segment being disposed adjacent the ends thereof, said outer ring segment having kinks therein for misaligning said apertures and said tongue portions.

5. The resilient mounting according to claim 2 wherein the tongue portions of said cradle member project inwardly of said yoke, the apertures in said outer ring segment being disposed in the circumferentially extending groove thereof.

References Cited in the file of this patent

UNITED STATES PATENTS

| | | |
|---|---|---|
| 1,996,166 | Meyer et al. | Apr. 2, 1935 |
| 2,044,385 | Geyer | June 16, 1936 |
| 2,296,221 | Pontis | Sept. 15, 1942 |